(12) United States Patent
Asahi (10) Patent No.: US 7,350,881 B2
(45) Date of Patent: Apr. 1, 2008

(54) MOTORCYCLE WITH ANTILOCK BRAKE SYSTEM

(75) Inventor: Koji Asahi, Hamana-Gun (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 238 days.

(21) Appl. No.: 11/012,275

(22) Filed: Dec. 16, 2004

(65) Prior Publication Data

US 2005/0134114 A1   Jun. 23, 2005

(30) Foreign Application Priority Data

Dec. 19, 2003   (JP) .............................. 2003-423599

(51) Int. Cl.
*B60T 8/32* (2006.01)

(52) U.S. Cl. ...................... 303/137; 180/312; 180/232; 180/291

(58) Field of Classification Search .................. 303/64, 303/137; 180/312, 291, 311, 232
See application file for complete search history.

(56) References Cited

U.S. PATENT DOCUMENTS

| | | | | |
|---|---|---|---|---|
| 4,421,359 A | * | 12/1983 | Hayashi et al. | ............ 303/9.61 |
| 4,465,322 A | * | 8/1984 | Hayashi | ..................... 303/9.64 |
| 4,702,339 A | * | 10/1987 | Hayashi et al. | ............. 180/219 |
| 4,766,982 A | * | 8/1988 | Hayashi et al. | ......... 188/181 A |
| 4,770,473 A | * | 9/1988 | Tsuchida | ................. 303/115.6 |
| 5,273,346 A | * | 12/1993 | Tsuchida et al. | ............... 303/2 |
| 5,377,776 A | * | 1/1995 | Saiki | .......................... 180/219 |
| 6,578,653 B2 | * | 6/2003 | Nagai | ......................... 180/230 |
| 6,990,932 B2 | * | 1/2006 | Kunimitsu et al. | ...... 123/41.33 |

* cited by examiner

*Primary Examiner*—Robert A Siconolfi
*Assistant Examiner*—Mariano Sy
(74) *Attorney, Agent, or Firm*—Oblon, Spivak, McClelland, Maier & Neustadt, P.C.

(57) ABSTRACT

In a motorcycle provided with an antilock brake system, a front fork supporting a front wheel of a motorcycle is supported to be rotatable by a head pipe which is located at the front end portion of a body frame of a motorcycle, a handle-bar is secured to an upper end portion of the head pipe, master cylinders attached to the handle-bar are connected to hydraulic wheel brakes, respectively, via brake pipes. An antilock brake system includes an ABS-unit for antilock control disposed in an intermediate portion of the brake pipes. The ABS-unit is disposed immediately behind the head pipe and between a pair of body frame components disposed on both lateral sides of the motorcycle body and extending, from the head pipe, obliquely downward and backward, while extending outward in directions opposite to each other in the width direction of the motorcycle body.

12 Claims, 5 Drawing Sheets

MOTORCYCLE WITH ANTILOCK BRAKE SYSTEM

BACKGROUND OF THE INVENTION

1. Field of the Invention

The present invention relates to a two-wheeled motor vehicle, such as motorcycle, provided with an antilock brake system, in which an ABS-unit is mounted on a vehicle body frame.

2. Related Art

Hitherto, in a scooter-type two-wheeled motor vehicle, which may be called "motorcycle" hereunder, in which a low-floored footrest is provided between a handle-bar and a seat, an ABS-unit of an antilock brake system is normally located in the vicinity of a head pipe at the front end of a vehicle body frame, in particular, in front of the head pipe, such as disclosed in Japanese Unexamined Patent Laid-open Publication No. HEI 9-216547 and No. HEI 11-314589. This arrangement is determined in consideration of the weight distribution between the front and rear portions of the motorcycle, reduction of the length of brake pipes, and so on.

However, in an arrangement in which the ABS-unit is arranged in front of the head pipe, a front cowl covering the front end of the vehicle body needs to be expanded so as to accommodate the ABS-unit. Moreover, in order to avoid interference with the rotation range of a front fork, the ABS-unit protrudes forward because it must be arranged in front of the head pipe at a certain distance therefrom. As a result, the front cowl suffers from considerable design constraints.

If the ABS-unit is arranged behind the head pipe in consideration of the matters mentioned above, it is difficult to secure sufficient space to accommodate the ABS-unit in view of body frame components. This not only causes difficulties in attaching and removing the ABS-unit in a case of trouble or the like, but also causes difficulties in installing of general rubber brake hoses having large diameters. However, use of small-diameter metal brake pipes causes further difficulties in attaching and removing the ABS-unit. Moreover, vibrations of the ABS-unit during its operation cannot be fully absorbed only by the metal brake pipes and are transmitted to the body frame, thereby causing discomfort to the rider.

SUMMARY OF THE INVENTION

An object of the present invention is to substantially eliminate defects or drawbacks encountered in the prior art mentioned above and to provide a motorcycle provided with an antilock brake system capable of avoiding an expansion and design constraints of a front cowl associated with the installation of an ABS-unit, maintaining proper weight distribution between the front and rear of the vehicle body, providing improved brake performance and engine performance, allowing for easy attachment and removal of the ABS-unit while keeping an easy installation of brake pipes, and effectively preventing vibrations of the ABS-unit from being transmitted, with a simple structure.

This and other object can be achieved according to the present invention by providing, in one aspect, a motorcycle provided with an antilock brake system, wherein a front fork supporting a front wheel of a motorcycle is supported to be rotatable by a head pipe located at the front end portion of a body frame of the motorcycle, a handle-bar is secured to one end portion of the head pipe, master cylinders attached to the handle-bar are connected to hydraulic wheel brakes, respectively, via brake pipes, and an ABS-unit for antilock control is disposed in an intermediate portion of the brake pipes, the ABS-unit being disposed immediately behind the head pipe and between a pair of body frame components disposed on both lateral sides of the motorcycle body and extending, from the head pipe, obliquely downward and backward, while extending outward in opposite directions in a width direction of the motorcycle body.

In a preferred embodiment of this aspect, a cylinder extends forward in a substantially horizontal manner from a front portion of an engine case, an engine provided with an intake unit, including air-fuel-mixture supply member and an air cleaner disposed above the cylinder, is disposed below the body frame, and the ABS-unit is disposed in a space defined, to be substantially triangular in a plan view, by the head pipe of the body frame, the pair of body frame components disposed on both lateral sides of the motorcycle body.

It is desired that an axis line of a drive motor for the ABS-unit and a hydraulic pump is directed in a direction substantially perpendicular to a front axis line of one of the paired body frame components, and the ABS-unit is disposed so that the drive motor thereof faces outward from a window hole immediately behind the head pipe, the window hole being opened outward in the width direction of the motorcycle body.

The ABS-unit may be disposed so that connecting portions between the ABS-unit and the brake pipes are arranged so as to face outward from a window hole, which is defined by the body frame components, immediately behind the head pipe of the body frame, the window hole being opened outward in the width direction of the motorcycle body. Furthermore, the ABS-unit is elastically supported by the body frame, the brake pipes connecting the ABS-unit to the master cylinders and to the wheel brakes are formed by connecting metal brake pipes and flexible brake, the brake pipes being connected to the ABS-unit through the metal brake pipes, and brake pipe supporting members for securing the intermediate portion of the brake pipes to the body frame are provided to a portion of the brake hoses, the brake pipe supporting members supporting the brake hoses at a portion near the connection to the metal brake pipes.

The motorcycle body between the handle-bar and a seat has a portion lowered so as to form a low-floored footrest, and an article accommodation box for accommodating an article and a fuel tank are disposed under the seat.

In another aspect of the present invention, there is provided a motorcycle provided with an antilock brake system which comprises: a motorcycle body provided with a body frame extending in a longitudinal direction thereof; a front fork supported by a head pipe disposed to a front end portion of the body frame, in which a handle-bar is secured to an upper end portion of the head pipe, and master cylinders attached to the handle-bar are connected to hydraulic wheel brakes, respectively, through brake pipes; a swing arm unit mounted to the body frame and connected to a rear wheel to be rotatable; an engine unit disposed at substantially a central portion of the motorcycle body and including a crankcase and an intake device; a transmission unit disposed behind the engine unit; a seat member disposed substantially above the engine unit; and an antilock brake system including an ABS-unit for antilock control disposed at an intermediate portion of the brake pipes, wherein the ABS-unit is disposed immediately behind the head pipe and between a pair of body frame components disposed to both lateral sides of the motorcycle body and extending, from the head pipe, obliquely downward and backward, while extending outward in directions opposite to each other in a width direction of the motorcycle body.

In this aspect, the antilock brake system may include the brake pipes, the ABS-unit disposed between the brake pipes, front and rear disc-brakes disposed for the front and rear wheels, respectively, and brake levers and the master cylinders which are operatively connected to the handle-bar for controlling the front and rear disc-brakes, respectively.

According to the motorcycle provided with the antilock brake system of the present invention of the characters mentioned above, the following advantages and/or advantageous functions and effects may be attained.

Since the ABS-unit is arranged behind the head pipe of the body frame, it is not necessary to specifically form the expansion of the front cowl covering the front end of the vehicle body, design constraints on the front cowl can be avoided, and proper weight distribution between the front and rear of the vehicle body can be maintained.

In addition, since the intake unit is interposed between the cylinder for the engine, which will become hot, and the ABS-unit, the ABS-unit can be prevented from being heated to high temperatures, and the brake performance can thus be improved.

Furthermore, since the ABS-unit can be brought close to the head pipe of the body frame, more proper weight distribution between the front and rear of the vehicle body can be achieved. If the air cleaner is disposed below the ABS-unit, the capacity of the air cleaner can be expanded to thereby improve engine performance.

Easy attachment and removal of the brake pipes allows for easy attachment and removal of the ABS-unit. Moreover, since no brake pipes are interposed between the ABS-unit and the body frame components, the ABS-unit can be installed in a limited space, the ABS-unit can be brought closer to the head pipe, and easy installation of the brake pipes can be achieved.

Furthermore, since the metal brake pipes stretch between the ABS-unit and flexible brake hoses that are elastically attached to the body frame, it is unnecessary to secure the metal brake pipes to the body frame. Therefore, the vibrations of the ABS-unit during its operation are not transmitted through the metal brake pipes to the body frame. Thus, transmission of the vibrations of the ABS-unit can be effectively prevented with a simple structure, in which no elastic supporting member is required for the metal brake pipes.

Still furthermore, the ABS-unit can be installed without disturbing the weight distribution of the vehicle body, even in the case where the footrest is located between the handle-bar and the seat. The article storage portion or space and the fuel tank are disposed under the seat. Accordingly, only a limited space is available inside the vehicle body.

The nature and further characteristic features of the present invention will be made more clear from the following descriptions made with reference to the accompanying drawings.

DESCRIPTION OF THE PREFERRED EMBODIMENT

A preferred embodiment of the present invention will be described hereunder with reference to the accompanying drawings.

Figure 1:
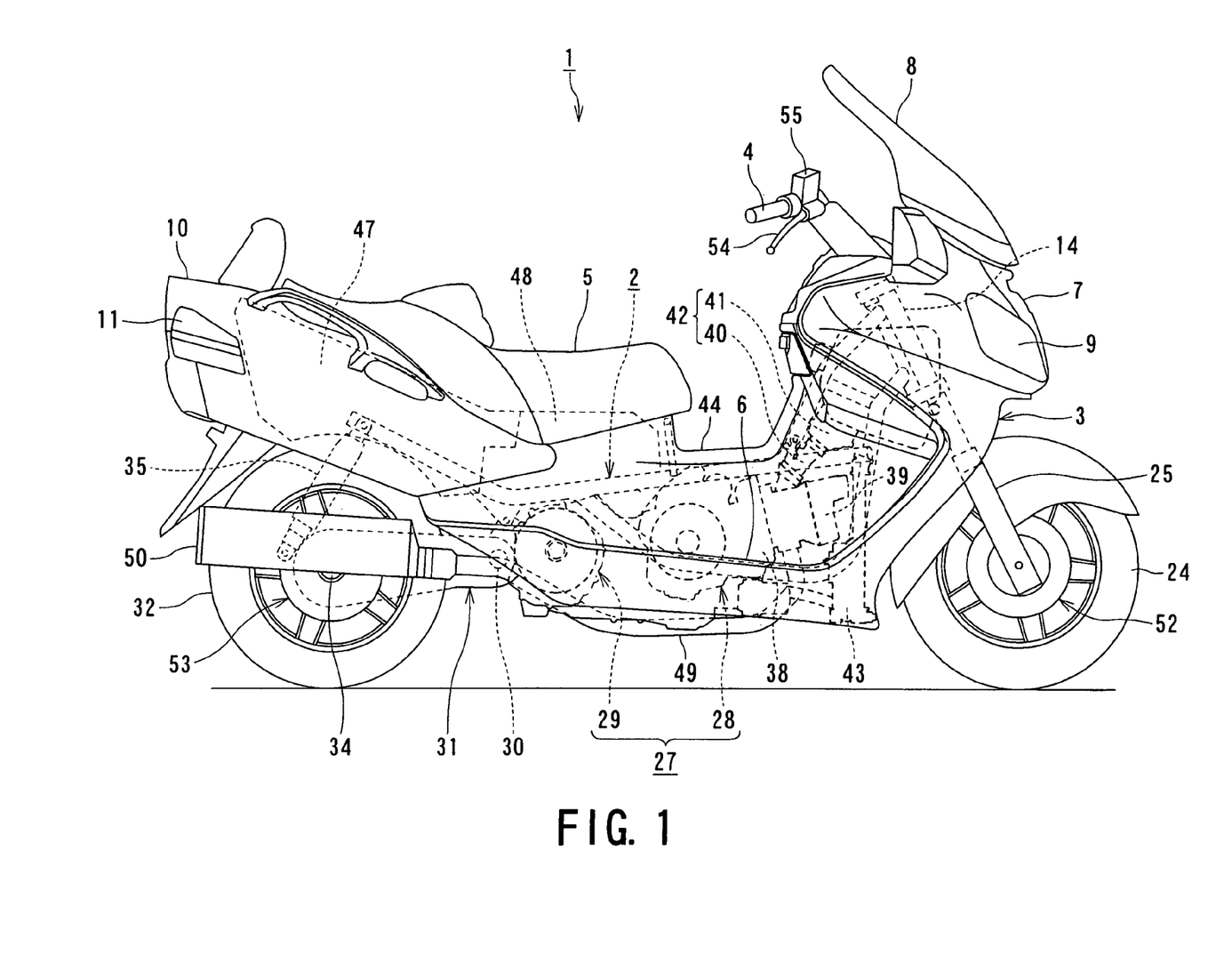
FIG. 1 is a right side view showing the two-wheeled motor vehicle, i.e., motorcycle, provided with an antilock brake system to which the present invention is applicable.

First, with reference to FIG. 1, a motorcycle 1 has a body frame 2 composed of steely pipes, which is covered with a resin frame cover 3. The motorcycle 1 is so-called scooter type one in which a portion between a handle-bar and a rider's seat is lowered to form a low-floored footrest 6.

The frame cover 3 forms a front cowl 7 covering the front end of the vehicle body. The front cowl 7 is provided, at an upper portion thereof, with a wind-shield 8 and, at a front end portion thereof, with a headlamp 9. The frame cover 3 forms a rear body 10 covering the rear portion of the vehicle (motorcycle) body and is provided with a tail lamp 11 at the tail portion.

Figure 2:
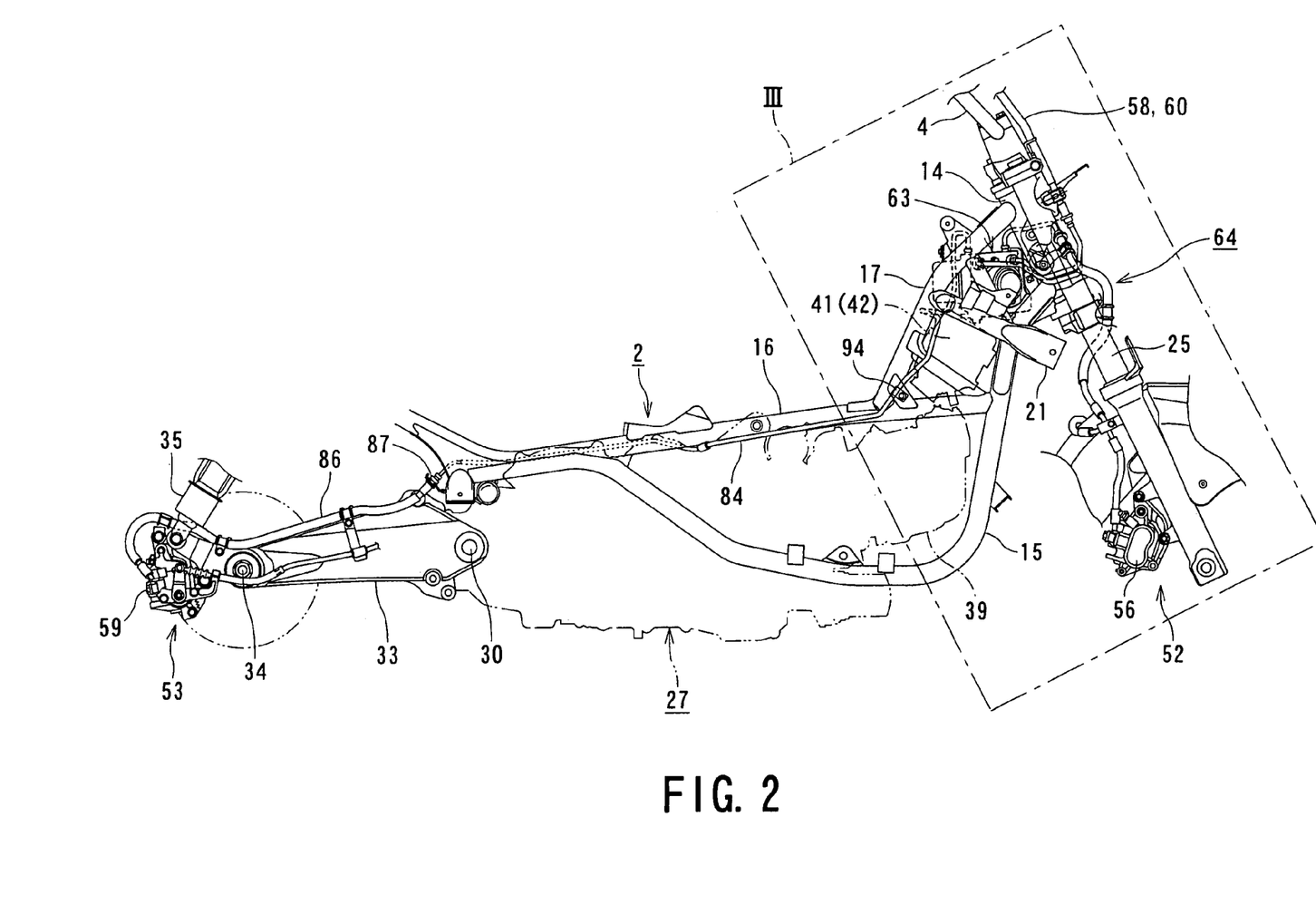
FIG. 2 is a right side view showing a body frame, a front fork, an antilock brake system and so on of the motorcycle of FIG. 1.
Figure 3:
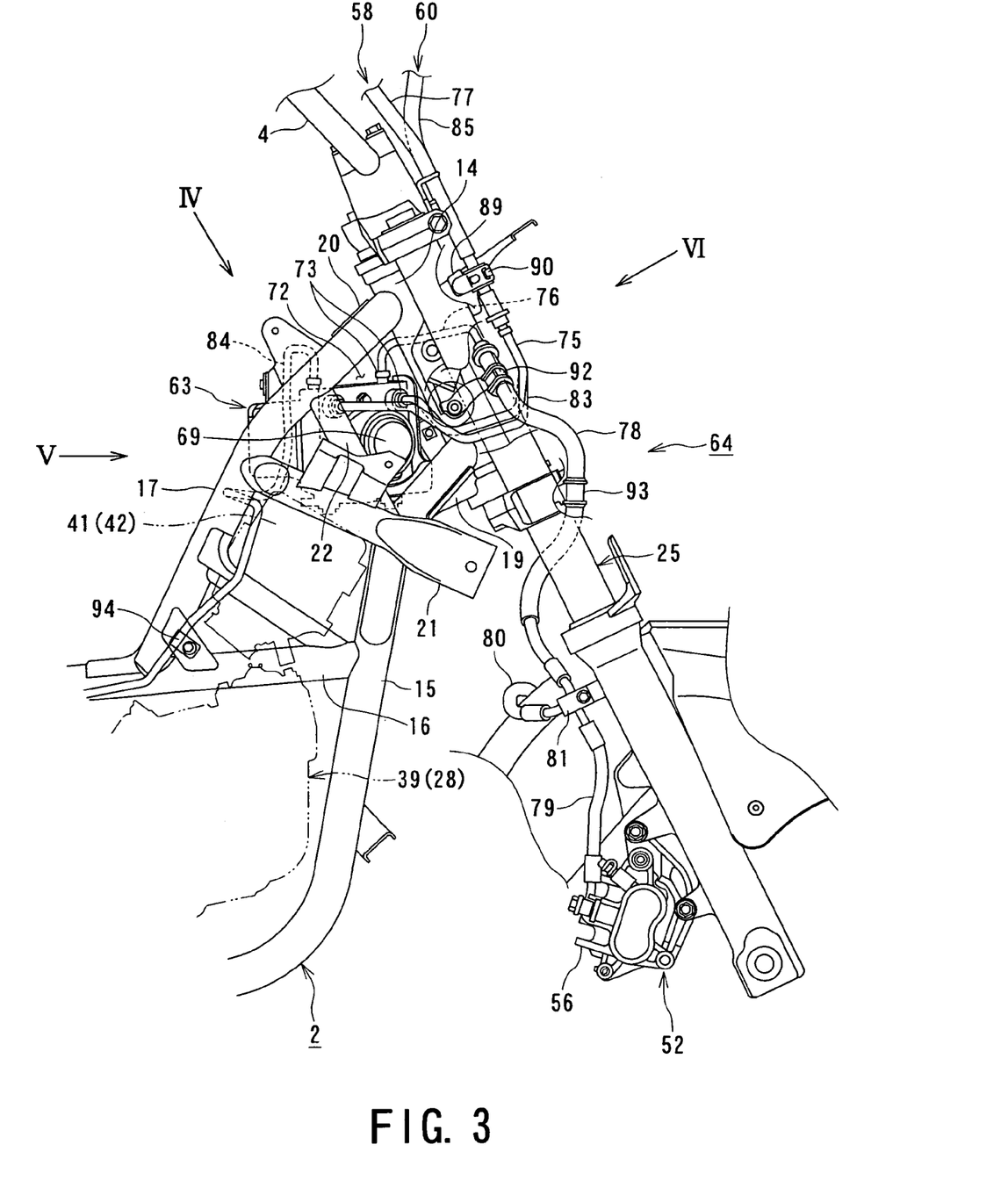
FIG. 3 is an enlarged view of an area III in FIG. 2 representing an embodiment of the present invention.

As shown in FIGS. 2 and 3, the body frame 2 includes a head pipe 14 at the front end. From the lower portion of the head pipe 14, a pair of left and right lower pipes 15 extends obliquely downward and backward, while extending outward in the directions opposite to each other along the width of the motorcycle body, curves further toward the rear side and extends obliquely upward and backward.

From the middle portion of the descending portion of the lower pipes 15, a pair of main pipes 16 extend backward and slightly downward with respect to the horizontal direction. The end portions of the lower pipes 15 are connected to the middle portion of the main pipes 16. From the upper end portion of the head pipe 14, a pair of left and right upper pipes 17 also extend obliquely downward and backward, while extending outward in the directions opposite to each other along the width of the motorcycle body. The end portions of the upper pipes 17 are connected to a middle section close to the front of the main pipes 16.

Figure 4:
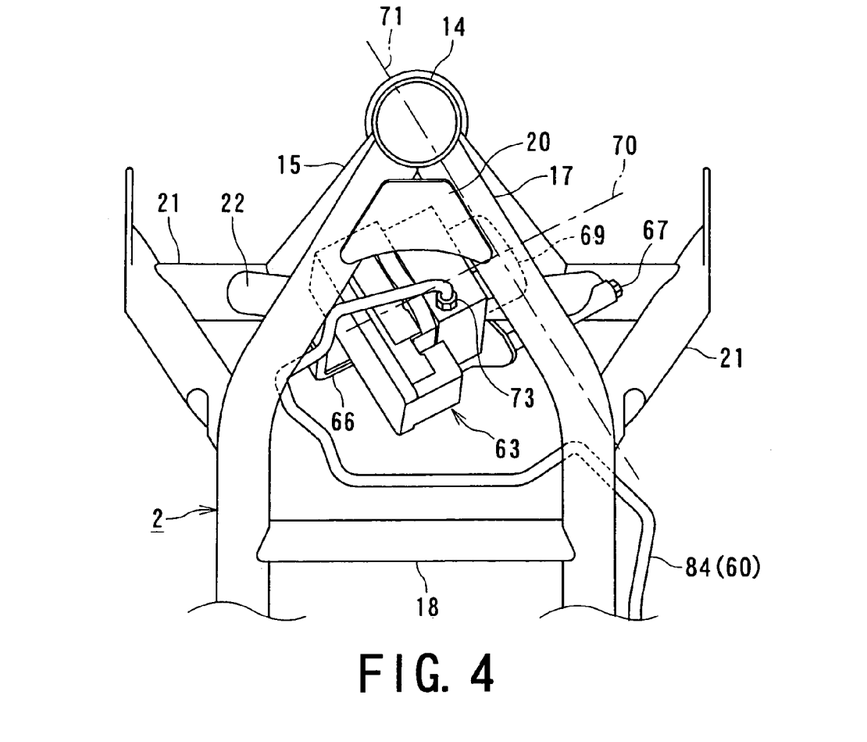
FIG. 4 is a diagram as viewed from a direction of an arrow IV in FIG. 3.
Figure 5:
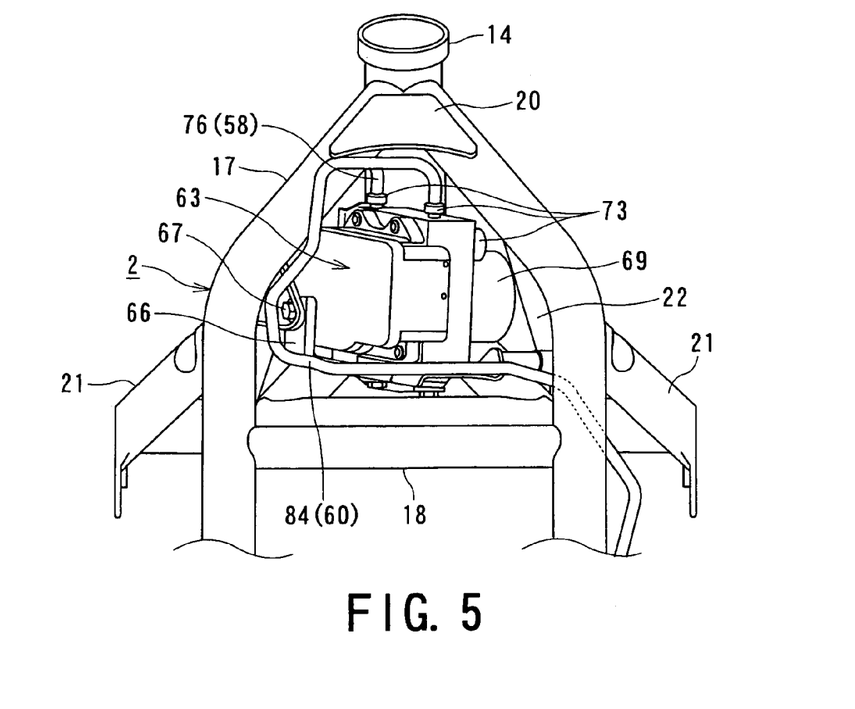
FIG. 5 is a diagram as viewed from a direction of an arrow V in FIG. 3.

The pair of left and right body frame components, such as the lower pipes 15, main pipes 16, and upper pipes 17, as mentioned above, are firmly interconnected with a plurality of horizontal bridges 18 stretching between the pair of pipes and along the width of the vehicle body as shown in FIG. 4 and FIG. 5. A reinforcing board 19 and a reinforcing board 20 are provided between the front end portions of the pair of left and right lower pipes 15 and upper pipes 17.

An intermediate portion of the lower pipes 15 and the upper pipes 17 is provided with a pair of left and right cowl stays 21, to which the front cowl 7 is secured. The upper pipes 17 and the cowl stays 21 are coupled through a pair of left and right vertical bridges 22.

A front fork 25 supporting a front wheel 24 is rotatably supported by the head pipe 14. The handle-bar 4 is secured to the upper end of the front fork 25. A power unit 27 is disposed along the lower side of the body frame 2.

The power unit 27 is a combined structure of an engine 28 and a transmission 29 located behind the engine 28. A power transmit unit or power transfer unit 31 is pivotally supported by a pivot shaft 30 disposed behind the transmission 29.

The power transmit unit 31 extends along the left side of a rear wheel 32, and a swing arm 33 extends from the pivot shaft 30 along the right side of a rear wheel 32 as shown in FIG. 2. The power transmit unit 31 and the swing arm 33 support both ends of an axle 34 of the rear wheel 32. The rear end of the power transmit unit 31 and the rear end of the body frame 2, i.e., main pipes 16, are coupled via a rear cushion unit 35 as a shock absorber.

In the engine 28 of the power unit 27, a cylinder 39 extends frontward in a substantially horizontal manner from the front portion of an engine case 38. An intake unit 42 including air-fuel-mixture supply member 40, such as a fuel injector and a carburetor, and an air cleaner 41 is disposed above the cylinder 39. A radiator 43 is disposed in front of the cylinder 39.

The footrest 6 is formed to be integral with the frame cover 3. The area between the left and right sides of the footrest 6 rises upward to form a center console 44 for covering the power unit 27, the intake unit 42 and the radiator 43. After the transmission 29 changes gears, the power unit 27, i.e., engine 28, transmits its power via the power transmit unit 31 to the rear wheel 32.

A storage space, i.e., article accommodation box, 47 for accommodating articles such as a helmet is arranged under the seat 5 and inside the rear body 10, and a fuel tank 48 is also disposed in front of the article accommodation box 47 under the seat 5 and inside the rear body 10. The article accommodation box 47 and the fuel tank 48 can be accessed by opening the seat 5. An exhaust pipe 49 extending from a portion under the cylinder 39 of the engine 28 runs backward along the underside of the power unit 27, and the rear end of the exhaust pipe 49 is then connected to an exhaust muffler 50 disposed on the right side of the rear wheel 32.

The front wheel 24 and the rear wheel 32 are provided with disc brakes 52 and 53, respectively, acting as hydraulic wheel brakes. The right grip of the handle-bar 4 is provided with a brake lever 54 and a master cylinder 55 for controlling the front disc brake 52, while the left grip of the handlebar 4 is provided with a brake lever and a master cylinder, which are not shown, for controlling the rear disc brake 53.

The master cylinder 55 is connected to a caliper 56 of the front disc brake 52 via a brake pipe 58, while the master cylinder for the rear wheel 32 is connected to a caliper 59 of the rear disc brake 53 via a brake pipe 60 as shown in FIG. 2 or FIG. 3. The brake pipe 58 extends downward along the head pipe 14 and the front fork 25 of the body frame 2, while the brake pipe 60 extends backward along the head pipe 14, the upper pipes 17, and the main pipes 16.

As shown in FIG. 2 to FIG. 6, an ABS-unit 63 is disposed at the front end portion of the body frame 2 and in an intermediate portion of the brake pipes 58 and 60. The ABS-unit 63, the front and rear disc brakes 52 and 53, the brake lever 54, the master cylinder 55, the brake pipes 58 and 60 constitute an antilock brake system 64 according to the present invention.

The ABS-unit 63 is elastically attached to the body frame 2 for absorbing vibration of the vehicle body, with a retaining bracket 66, an elastic retainer, such as a rubber bush, not shown, and several bolts 67. The ABS-unit 63 is located immediately behind the head pipe 14 of the body frame 2 and between the pair of left and right lower pipes 15 and upper pipes 17, which constitute the body frame components extending obliquely downward and backward from the head pipe 14, while extending outward in the directions opposite to each other in the width direction of the vehicle. Specifically, the ABS-unit 63 is located in a space defined by the head pipe 14, the lower pipes 15 and upper pipes 17, and the air cleaner 41 included in the intake unit 42 for the power unit 27, the space being substantially triangular in a plan view of the motorcycle.

As shown in FIG. 4, the ABS-unit 63 is disposed so that axes 70 of a drive motor 69 for the ABS-unit 63 and the hydraulic pump are directed substantially perpendicular to a front axis 71 of one of lateral lower pipe 15 and the upper pipe 17. Moreover, as shown in FIG. 3, the ABS-unit 63 is disposed so that the drive motor 69 faces outward from a window hole 72, which is defined by the lower pipes 15, the upper pipes 17, and the vertical bridges 22 immediately behind the head pipe 14, the window hole 72 being opened outward in the width direction of the motorcycle body. Furthermore, as shown in FIG. 3, connecting portions 73 between the ABS-unit 63 and the brake pipes 58 and 60 are arranged so as to face outward from the window hole 72.

The brake pipe 58 for the front wheel 24 is composed of metal brake pipes 75 and 76 and flexible brake hoses 77, 78, 79 and 80 which are connected together. The metal brake pipes 75 and 76 are connected to the inlet side and outlet side of the ABS-unit 63, respectively. The metal brake pipe 75 at the inlet side is connected to the master cylinder 55 via the brake hose 77. The metal brake pipe 76 at the outlet side is connected via the brake hose 78 to a delivery joint 81, as shown in FIG. 3, located in the intermediate portion of the front fork 25. The delivery joint 81 is connected to the left and right sides of the caliper 56 for the front disc brake 52 via the respective brake hoses 79 and 80.

On the other hand, the brake pipe 60 is composed of metal brake pipes 83 and 84 and brake hoses 85 and 86 which are connected together. The metal brake pipes 83 and 84 are also connected to the inlet side and outlet side of the ABS-unit 63, respectively. The metal brake pipe 83 at the inlet side is connected to the master cylinder for the rear wheel via the brake hose 85.

The metal brake pipe 84 at the outlet side extends backward along the main pipes 16 of the body frame 2. The rear end of the metal brake pipe 84 is connected to the brake hose 86 at the position of a brake-pipe supporting bracket 87 located above the pivot shaft 30. The brake hose 86 extends backward along the swing arm 33 and is connected to the caliper 59 for the rear disc brake 53.

As described above, in the brake pipes 58 and 60, connections to the ABS-unit 63 are made through the metal brake pipes 75, 76, 83 and 84. In other words, only the metal brake pipes 75, 76, 83 and 84 are connected to the ABS-unit 63 and none of the brake hoses 77, 78, 85 and 86 is directly connected to the ABS-unit 63.

Figure 6:
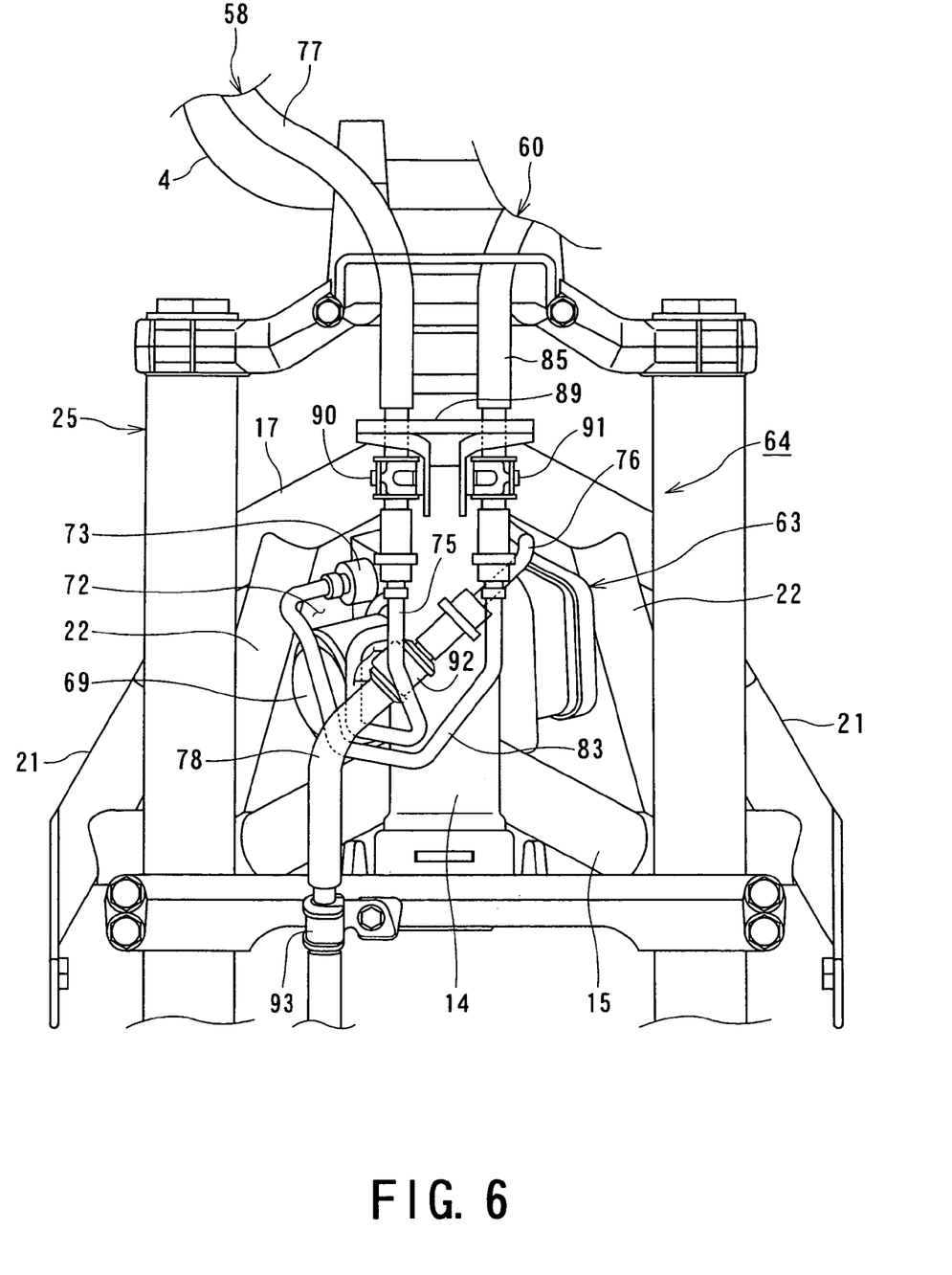
FIG. 6 is a diagram as viewed from a direction of an arrow VI in FIG. 3.

As shown in FIG. 3 and FIG. 6, the intermediate portion of the brake pipe 58 and the brake pipe 60 is secured to the head pipe 14 and the front fork 25 with clamps 90 and 91 for a brake pipe supporting member 89 in form of bracket, a brake pipe supporting member 92 arranged to the right of the head pipe 14, and a brake pipe supporting member 93 located in the middle of the front fork 25.

The clamps 90 and 91 for the brake pipe supporting member 89 clamp the brake hoses 77 and 85 of the brake pipes 58 and 60 in a portion near the connection to the metal brake pipes 75 and 83, that is, in a part of the brake hoses 77 and 85 closest to the ABS-unit 63.

The brake pipe supporting member 92 clamps the brake hose 78 of the brake pipe 58 at a portion near the connection to the metal brake pipe 76, that is, at a portion of the brake hose 78 closest to the ABS-unit 63. The brake pipe supporting member 93 supports the intermediate portion of the brake hose 78.

A fixed portion 94, at which the metal brake pipe 84 of the brake pipe 60 extending from the ABS-unit 63 is first secured to the body frame 2, is located with a sufficient distance from the ABS-unit 63. In the portion between the ABS-unit 63 and the fixed part 94, the metal brake pipe 84 is bent so as not to be linear.

In a normal braking operation of the antilock brake system 64 structured as described above, the rider grips the front-wheel brake lever 54 and the rear-wheel brake lever to cause the front-wheel master cylinder 55 and the rear-wheel master cylinder to generate brake hydraulic pressure, which is then applied to the front and rear disc brakes 52 and 53 via the brake pipes 58 and 60, thereby applying the brakes on the front and rear wheels 24 and 32.

If the front wheel 24 or the rear wheel 32 stops rotating during its rapid braking or during its braking on a road with a low coefficient of friction, this fact is immediately detected by rotation sensors, which are not shown, provided for the front and rear wheels 24 and 32, and detection signals are generated and inputted into the ABS-unit 63 so as to cause the ABS-unit 63 to intermittently reduce the brake hydraulic pressure little by little, while allowing braking to continue without bringing the rotation of the front and rear wheels 24 and 32 to a halt, thus minimizing the braking distance.

Since the ABS-unit 63 of the antilock brake system 64 is disposed directly behind the head pipe 14, expansion and design constraints of the front cowl 7, which are inevitable in the case where the ABS-unit 63 is disposed in front of the head pipe 14, can be avoided. Moreover, since the ABS-unit 63 having a heavy weight is located at the front end of the motorcycle, the weight distribution between the front and rear of the vehicle body can be properly maintained.

Furthermore, the ABS-unit 63 is disposed in the space defined by the head pipe 14, the lower pipes 15 and the upper pipes 17 of the body frame 2, and the air cleaner 41 included in the intake unit 42 for the power unit 27 (i.e., engine 28), the space being substantially triangular in a plan view of the motorcycle, and accordingly, the intake unit 42 (i.e., air cleaner 41) is interposed between the cylinder 39 for the engine 28, which will become hot, and the ABS-unit 63. Thus, the ABS-unit 63 can be prevented from being heated to high temperatures, and the brake performance can be hence improved.

Still furthermore, the axis line 70 of the drive motor 69 for the ABS-unit 63 and hydraulic pump is directed in the direction substantially perpendicular or orthogonal to the front axis line 71 of the left or right lower pipe 15 and upper pipe 17, so that the ABS-unit 63 can be brought to the head pipe 14 of the body frame 2 as close as possible. This not only provides proper weight distribution between the front and rear of the vehicle body, but also ensures effective use of space. In addition, the increasing of the indentation of the center console 44 will enable the rider to easily straddle the vehicle body, that is, enable the rider to easily get on and off the motorcycle.

Moreover, the ABS-unit 63 is disposed such that the drive motor 69 faces outward from the window hole 72, which is defined by the lower pipes 15, the upper pipes 17, and the vertical bridges 22 immediately behind the head pipe 14, the window hole 72 being opened outward in the width direction of the vehicle body. This not only provides ease of maintenance of the ABS-unit 63, but also increases the capacity of the air cleaner 41, thereby improving the performance of the engine 28.

Furthermore, the ABS-unit 63 is disposed so that the connections 73 between the ABS-unit 63 and the brake pipes 58 and 60 are arranged so as to face outward from the window hole 72 of the body frame 2. This allows for easy attachment and removal of the brake pipes 58 and 60, thereby providing easy attachment and removal of the ABS-unit 63. Moreover, the brake pipes 58 and 60 are not interposed between the ABS-unit 63 and the body frame components. This fact enables the ABS-unit 63 to be installed in a limited space, brings the ABS-unit 63 closer to the head pipe 14 so as to make proper the distribution of the weight between the front and rear portions of the vehicle body, and allows easy installation of the brake pipes 58 and 60.

As described above, in the arrangement of the present invention, the ABS-unit 63 is elastically supported to absorb the vibration absorption by the body frame 2. The brake pipes 58 and 60 are composed of the metal brake pipes 75, 76, 83 and 84 and flexible brake hoses 77, 78, 79, 80, 85 and 86 which are connected together. In addition, in the brake pipes 58 and 60, connections to the ABS-unit 63 are made through the metal brake pipes 75, 76, 83 and 84. The middle or intermediate portion of the brake pipes 58 and 60 is secured to the body frame 2 (i.e., head pipe 14) by the brake pipe supporting members 89 and 92, which then support a portion of the brake hoses 77, 78 and 85 near the connection to the metal brake pipes 75, 76 and 83, that is, the portion closest to the ABS-unit 63.

According to the structure mentioned above, since the metal brake pipes 75, 76 and 83 stretch between the ABS-unit 63 elastically attached to the body frame 2 and the brake hoses 77, 78 and 85 also elastically attached to the body frame 2 (head pipe 14) by their elasticity, it is unnecessary to secure the metal brake pipes 75, 76 and 83 themselves to the body frame 2.

Therefore, the vibrations of the ABS-unit 63 during the operation thereof cannot be transmitted through the metal brake pipes 75, 76 and 83 to the body frame 2. Thus, with such simple structure in which no elastic supporting member is required for the metal brake pipes 75, 76 and 83, the vibrations of the ABS-unit 63 can be effectively prevented from being transmitted to the vehicle body.

The fixed portion 94, at which the metal brake pipe 84 for the rear wheel 32 extending from the ABS-unit 63 is first secured to the body frame 2, is located at a sufficient distance from the ABS-unit 63. In addition, in the portion between the ABS-unit 63 and the fixed portion 94, the metal brake pipe 84 is bent so as not to be linear. Therefore, the vibrations of the ABS-unit 63 during the operation thereof are not easily transmitted through the metal brake pipe 84 to the body frame 2.

In the two-wheeled motor vehicle such as motorcycle 1 structured as described above, the footrest 6 is provided between the handle-bar 4 and the seat 5, while the article accommodation box 47 and the fuel tank 48 are disposed under the seat 5. Although the motorcycle 1 mentioned herein is a scooter-type vehicle having a limited space inside the body, the ABS-unit 63 can be installed without disturbing the weight distribution of the vehicle body, thus being advantageous and convenient.

It is further to be noted that the present invention is not limited to the described embodiment and many other changes and modifications may be made without departing from the scopes of the appended claims.

What is claimed is:

1. A motorcycle provided with an antilock brake system, comprising:

a head pipe;

a front fork supporting a front wheel supported to be rotatable by the head pipe located at a front end portion of a body frame of the motorcycle;

a handle-bar secured to one end portion of the head pipe;

at least one master cylinder attached to the handle-bar and connected to hydraulic wheel brakes, respectively, via brake pipes; and an ABS-unit for antilock control disposed in an intermediate portion of the brake pipes, immediately behind the head pipe and between a pair of body frame components disposed on lateral sides of the motorcycle body frame and extending, from the head pipe, obliquely downward and backward, while extending outward in directions opposite to each other in a width direction of the motorcycle body frame, wherein an axis line of a drive motor for the ABS-unit and a hydraulic pump are directed in a direction substantially perpendicular to a front axis line of one of the paired body frame components, and the ABS-unit is disposed so that the drive motor thereof faces outward from a window hole immediately behind the head pipe, the window hole being opened outwardly in the width direction of the motorcycle body frame.

2. A motorcycle provided with an antilock brake system according to claim 1, further comprising:

a cylinder extending forward in a substantially horizontal manner from a front portion of an engine case;

an engine provided with an intake unit, including air-fuel-mixture supply member and an air cleaner disposed above the cylinder and disposed below the body frame, wherein the ABS-unit is disposed in a space defined, to be substantially triangular in a plan view, by the head pipe of the body frame, and the pair of body frame components disposed on both lateral sides of the motorcycle body frame.

3. A motorcycle provided with an antilock brake system according to claim 1, wherein the ABS-unit is disposed so that connecting portions between the ABS-unit and the brake pipes are arranged so as to face outward from a window hole, which is defined by the body frame components, immediately behind the head pipe of the body frame, said window hole being opened outward in the width direction of the motorcycle body frame.

4. A motorcycle provided with an antilock brake system according to claim 1, wherein the ABS-unit is elastically supported by the body frame, the brake pipes connecting the ABS-unit to the master cylinders and to the wheel brakes are formed by connecting metal brake pipes and flexible brake hoses, said brake pipes being connected to the ABS-unit through the metal brake pipes, and brake pipe supporting members for securing the intermediate portion of the brake pipes to the body frame are provided to a portion of the brake hoses, said brake pipe supporting members supporting the brake hoses at a portion near the connection to the metal brake pipes.

5. A motorcycle provided with an antilock brake system according to claim 1, wherein the motorcycle body frame between the handle-bar and a seat has a portion lowered so as to form a low-floored footrest, and an article accommodation box for accommodating an article and a fuel tank are disposed under the seat.

6. A motorcycle provided with an antilock brake system comprising:

a motorcycle body including a body frame extending in a longitudinal direction thereof;

a front fork supported by a head pipe disposed to a front end portion of the body frame, in which a handle-bar is secured to an upper end portion of the head pipe, and at least one master cylinder attached to the handle-bar and connected to hydraulic wheel brakes, respectively, through brake pipes;

a swing arm unit mounted to the body frame and connected to a rear wheel to be rotatable;

an engine unit disposed at substantially a central portion of the motorcycle body and including a crank case, a cylinder and an intake device including air-fuel-mixture supply member and an air cleaner disposed above the cylinder;

a transmission unit disposed behind the engine unit;

a seat member disposed above the engine unit; and an antilock brake system including an ABS-unit for antilock control disposed at an intermediate portion of the brake pipes, wherein the ABS-unit is disposed in a space defined by the head pipe of the body frame, a pair of body frame components disposed to both lateral side portions of the motorcycle body and extending, from the head pipe, obliquely downward and backward, while extending outward in directions opposite to each other in a width direction of the motorcycle body and a top surface of the intake device.

7. A motorcycle provided with an antilock brake system according to claim 6, wherein the antilock brake system includes the brake pipes, the ABS-unit disposed between the brake pipes, front and rear disc-brakes disposed for the front and rear wheels, respectively, and brake levers and the master cylinders which are operatively connected to the handle-bar for controlling the front and rear disc-brakes, respectively.

8. A motorcycle provided with an antilock brake system, comprising:

a front fork supporting a front wheel of the motorcycle, the front fork being supported to be rotatable by a head pipe located at a front end portion of a body frame of the motorcycle;

a handle-bar secured to one end portion of the head pipe;

master cylinders attached to the handle-bar and connected to hydraulic wheel brakes, respectively, via brake pipes;

an ABS-unit for antilock control disposed in an intermediate portion of the brake pipes;

a cylinder extending forward in a substantially horizontal manner from a front portion of an engine case; and an engine provided with an intake unit, including air-fuel-mixture supply member and an air cleaner disposed above the cylinder, the engine being disposed below the body frame, wherein the ABS-unit is disposed in a space defined by the head pipe of the body frame, a pair of body frame components disposed on lateral sides of the motorcycle body frame and extending, from the head pipe, obliquely downward and backward, while extending outward in directions opposite to each other in a width direction of the motorcycle body frame, and a top surface of the intake unit.

9. A motorcycle provided with an antilock brake system according to claim 8, wherein an axis line of a drive motor for the ABS-unit and a hydraulic pump is directed in a direction substantially perpendicular to a front axis line of one of the paired body frame components, and the ABS-unit is disposed so that the drive motor thereof faces outward from a window hole immediately behind the head pipe, said window hole being opened outward in the width direction of the motorcycle body frame.

10. A motorcycle provided with an antilock brake system according to claim 8, wherein the ABS-unit is disposed so that connecting portions between the ABS-unit and the brake pipes are arranged so as to face outward from a window hole, which is defined by the body frame components, immediately behind the head pipe of the body frame, said window hole being opened outward in the width direction of the motorcycle body frame.

11. A motorcycle provided with an antilock brake system according to claim 8, wherein the ABS-unit is elastically supported by the body frame, the brake pipes connecting the ABS-unit to the master cylinders and to the wheel brakes are formed by connecting metal brake pipes and flexible brake hoses, said brake pipes being connected to the ABS-unit through the metal brake pipes, and brake pipe supporting members for securing the intermediate portion of the brake pipes to the body frame are provided to a portion of the brake hoses, said brake pipe supporting members supporting the brake hoses at a portion near the connection to the metal brake pipes.

12. A motorcycle provided with an antilock brake system according to claim 8, wherein the motorcycle body frame between the handle-bar and a seat has a portion lowered so as to form a low-floored footrest, and an article accommodation box for accommodating an article and a fuel tank are disposed under the seat.

* * * * *